United States Patent
Vegso et al.

(10) Patent No.: US 6,364,286 B1
(45) Date of Patent: Apr. 2, 2002

(54) MANUALLY ACTUATED VALVE

(75) Inventors: Zsolt F. Vegso, Culver; Ray W. Cole, Lakeville, both of IN (US)

(73) Assignee: BPC Manufacturing, Inc., Plymouth, IN (US)

( * ) Notice: Subject to any disclaimer, the term of this patent is extended or adjusted under 35 U.S.C. 154(b) by 0 days.

(21) Appl. No.: 09/580,147

(22) Filed: May 30, 2000

Related U.S. Application Data

(60) Provisional application No. 60/149,785, filed on Aug. 19, 1999.

(51) Int. Cl.[7] ............................................. F16K 31/46
(52) U.S. Cl. ...................................... 251/294; 137/899
(58) Field of Search ................................ 251/294, 293; 137/899

(56) References Cited

U.S. PATENT DOCUMENTS

| | | | | |
|---|---|---|---|---|
| 3,954,250 A | * | 5/1976 | Grace | 251/294 X |
| 4,875,504 A | * | 10/1989 | Nicholson | 137/899 |
| 4,907,676 A | * | 3/1990 | Shirdavani | 251/294 X |
| 5,678,802 A | | 10/1997 | Lunder | |
| 5,724,908 A | * | 3/1998 | Murray | 114/197 |

* cited by examiner

Primary Examiner—Kevin Lee
(74) Attorney, Agent, or Firm—Baker & Daniels

(57) ABSTRACT

A vehicle waste water valve in the form of a gate valve having a retractable gate movable in response to a movable gate which is vertically movably by way of cable pull assembly. The cable pull assembly includes an outer jacket sheath with a solid cable inside the sheath which is axially movable, and has its free end connected to the gate stem. The cable pull sheath is held in an axial manner by way of its connection within a termination block, wherein a threaded member is threaded into the termination block and into the cable pull sheath, where the threaded member extends along an axial length of the cable pull sheath. The termination block in turn can be threadably attached to a cable pull body, which in turn is latchably attached to the valve body.

20 Claims, 8 Drawing Sheets

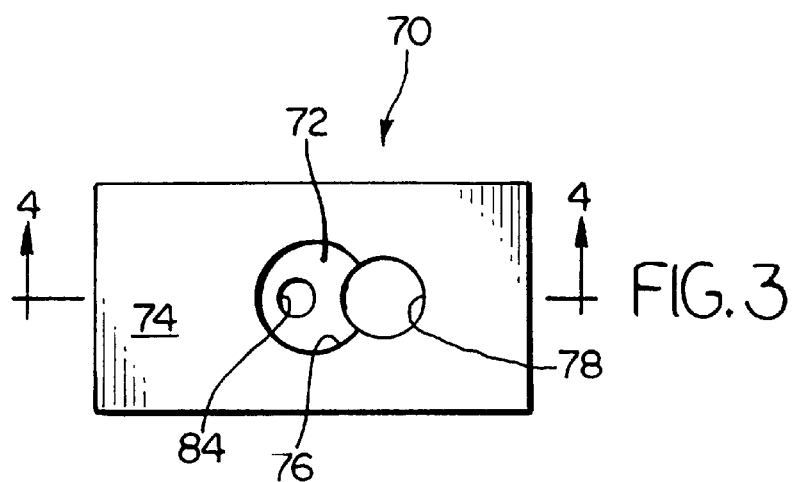
FIG. 3
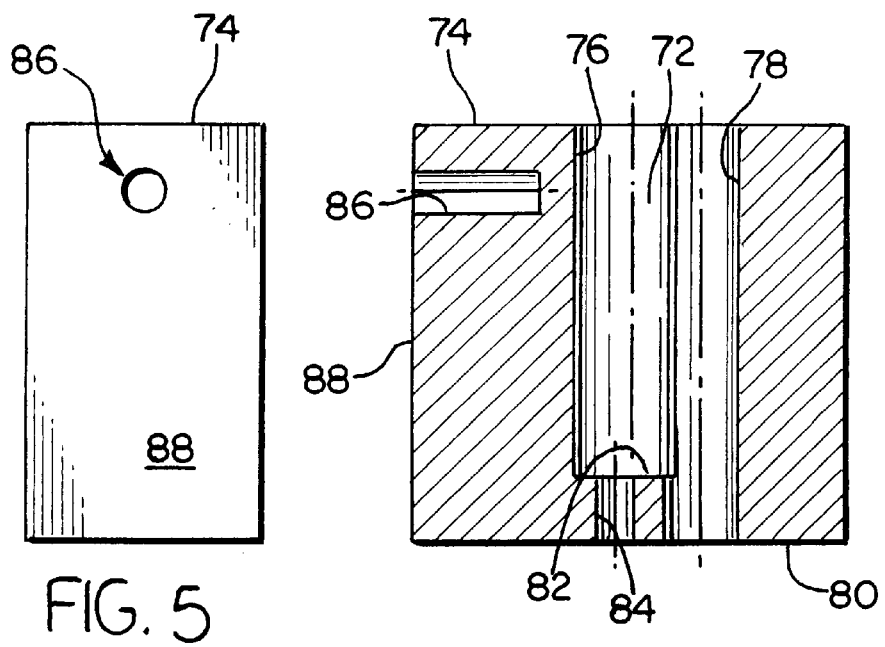
FIG. 5
FIG. 4
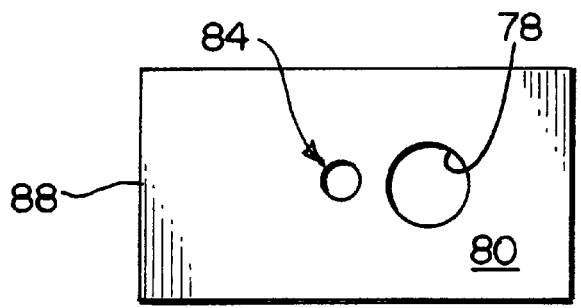
FIG. 6

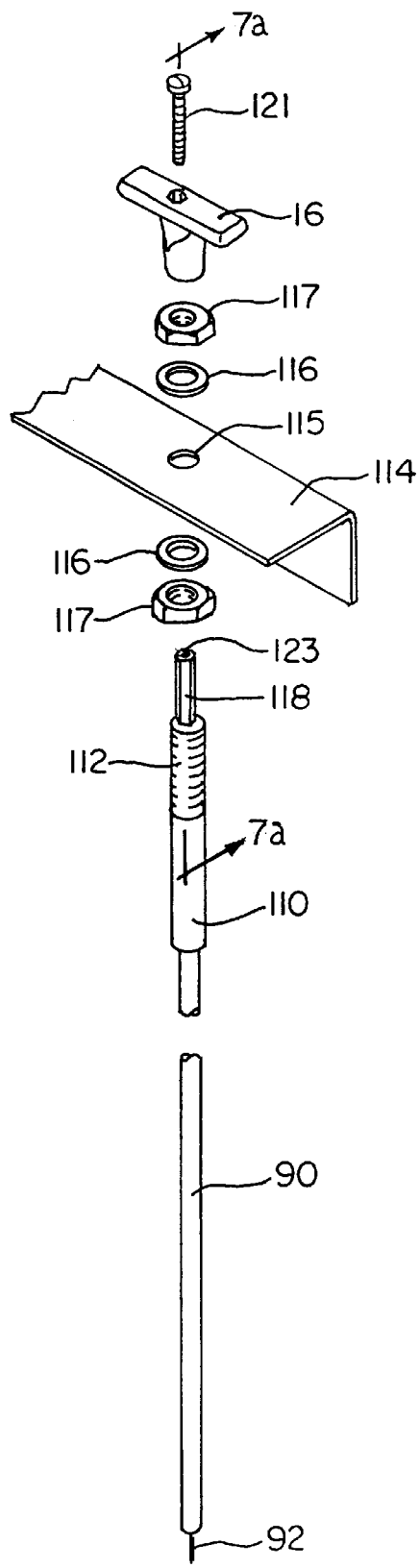
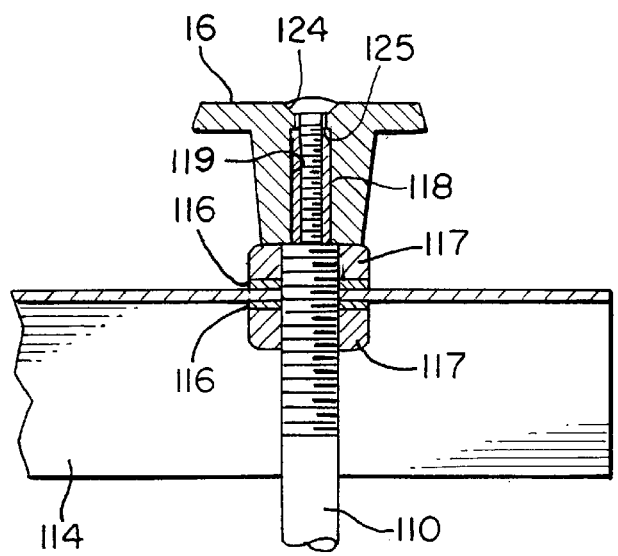
FIG. 7
FIG. 7a

MANUALLY ACTUATED VALVE

This application claims benefit of Provisional Application Ser. No. 60/149,785 filed Aug. 19, 1999.

BACKGROUND OF THE INVENTION

1. Brief Description of the Invention

The subject invention relates to a manually actuated valve for plumbing purposes, and more particularly, to a valve which can be installed on a recreational vehicle for the storage, and subsequent discharge of waste waters held therein.

2. Discussion of the Prior Art

In recreational vehicles and motor homes, storage tanks are provided for storage of the waste waters accumulated during the travels, from both the kitchen and lavatory facilities. When the user is traveling away from a rest area or camp ground area, storage tanks are provided beneath the vehicle which accumulate the waste waters. When the user returns to an area where drainage facilities are available, the vehicles can be pulled adjacent to the facilities, and a valve can be opened, allowing for the drainage of the waste waters.

As the drain must be adjacent to an edge of the vehicle, originally, these valves were too, along an edge of the vehicle where the valve actuator could be accessed, typically some type of actuation mechanism which imparts movement to a gate of a gate valve. The market then moved towards an under mount valve, where the actuator was positioned adjacent to an outer edge of the vehicle, such that the valve itself could be hidden; but a drainage pipe and the actuation member were adjacent to the edge of the vehicle. The actuation member includes a cable pull assembly, where a cable is axially movable within an outer sheath, and the cable is attached to a gate for movement of the gate. Such an assembly is shown in U.S. Pat. No. 5,678,802 to Launder. Herein incorporated by reference.

One of the shortcomings to this design, particularly in the commercialized version, is that the cable assembly is comprised of a very stiff jacket around the cable, which includes a heavy steel band integrated therein. This heavy cable is necessary because of the clamshell style clamps which provide the only means of securing the jacket to the valve assembly by grippingly engaging the cable jacket. While the clamshell style clamps hold the cable jacket merely with pressure, the cable is resultantly limited in its flexibility and routing through the vehicle. Secondly, the heavy steel band can rust due to moisture exposure. In addition, a permanently affixed shoulder adjacent the actuating handle on the cable assembly requires that the cable be inserted from the exterior of the vehicle, thereby, preventing, preassembly of the cable to the valve.

An object of the invention is to provide a cable pull actuated valve including a cable having a more pliable outer covering for easier routing of the cable within the vehicle, the cable cover being composed of materials which will not rust or otherwise degrade.

Another object of the invention is to have a cable mechanism preassembled to the valve mechanism before the valve is installed in the recreational vehicle to simplify installation thereof.

An additional object of the invention is to provide a cable pull actuated valve wherein the outer covering of the cable is mechanically fixed to preclude longitudinal movement thereof relative to a valve body.

SUMMARY OF THE INVENTION

The objects of the invention were accomplished by providing a cable pull assembly comprised of a shroud member, and a cable positioned within an internal bore of the shroud member, where the cable can be pulled at one end thereof, for activation of a mechanism at the opposite end thereof. The assembly further comprises a termination block for attaching to the shroud member for axial fixation of the shroud member, and the termination block includes at least one longitudinal aperture. A first aperture receives the cable pull assembly therein, and the shroud being held from movement in the longitudinal direction within the termination block by a fixing fastener. Another object of the invention is to provide a three layer shroud including an outer non-metallic shroud, an inner non-metallic shroud, and an internal metallic sheath sandwiched therebetween.

In another aspect of the invention, a gate valve assembly comprises a valve body having a fluid passageway therethrough, and a gate movable in a transverse direction to the passageway with a valve stem for moving the gate in the transverse direction. A cable pull body is also included having a cable receiving aperture therethrough, the cable pull body having retaining legs on one end thereof, with a latching mechanism for snap latching to the valve body, and a cable retaining mechanism at the other end thereof. A cable pull mechanism is fixed to the cable pull body by the cable retaining mechanism, and the cable pull mechanism comprises an elongate tubular shroud having a cable therein, the cable being fixed to the gate, yet movable within the shroud to activate the gate between open and closed positions. The cable includes a removable handle for activation of the mechanism, and is capable of being threaded through a recreational vehicle from where the gate valve assembly is located to the exterior of the recreational vehicle where the handle will be mounted.

In yet another aspect of the invention, a gate valve assembly comprises a valve body having an opening therethrough for fluid, and a gate movable in a transverse direction to the opening with a valve stem for moving the gate in the transverse direction. A cable pull body is included having a cable receiving aperture therethrough, with the cable pull body being attached to the valve body. A cable pull mechanism is further included comprising an elongate tubular shroud having a cable therein being fixed to the gate, and longitudinally movable within the shroud between open and closed positions. A cable retaining mechanism fixes the cable pull mechanism to the cable pull body, and comprises a termination block for attaching to the shroud for longitudinal fixation of the shroud, and a fixing fastener which is held in the longitudinal direction to the termination block, and which holds the cable shroud in the longitudinal direction.

There has thus been outlined, rather broadly, the more important features of the invention in order that the detailed description herein that follows may be better understood, and in order that the present contribution to the art may be better appreciated. There are, of course, additional features of the invention that will be described hereinafter and will form the subject matter of the claims appended hereto.

BRIEF DESCRIPTION OF THE DRAWINGS

The invention will now be described with reference to the drawing figures, where:

FIG. 3 is a top view of the termination block of the assembly, which fixes the cable pull assembly to the valve body;

FIG. 4 is a cross sectional view taken through lines 4—4 of FIG. 3;

FIG. 5 is a side view of the termination block of FIG. 4;

FIG. 6 is a lower plan view of the cross sectional view of FIG. 4;

FIG. 7 is a perspective view of the handle portion of the assembly shown in an exploded form.

FIG. 7a is a cross sectional view through the handle of the assembly taken along lines 7a of FIG. 7.

DETAILED DESCRIPTION OF THE PREFERRED EMBODIMENT

Figure 1:
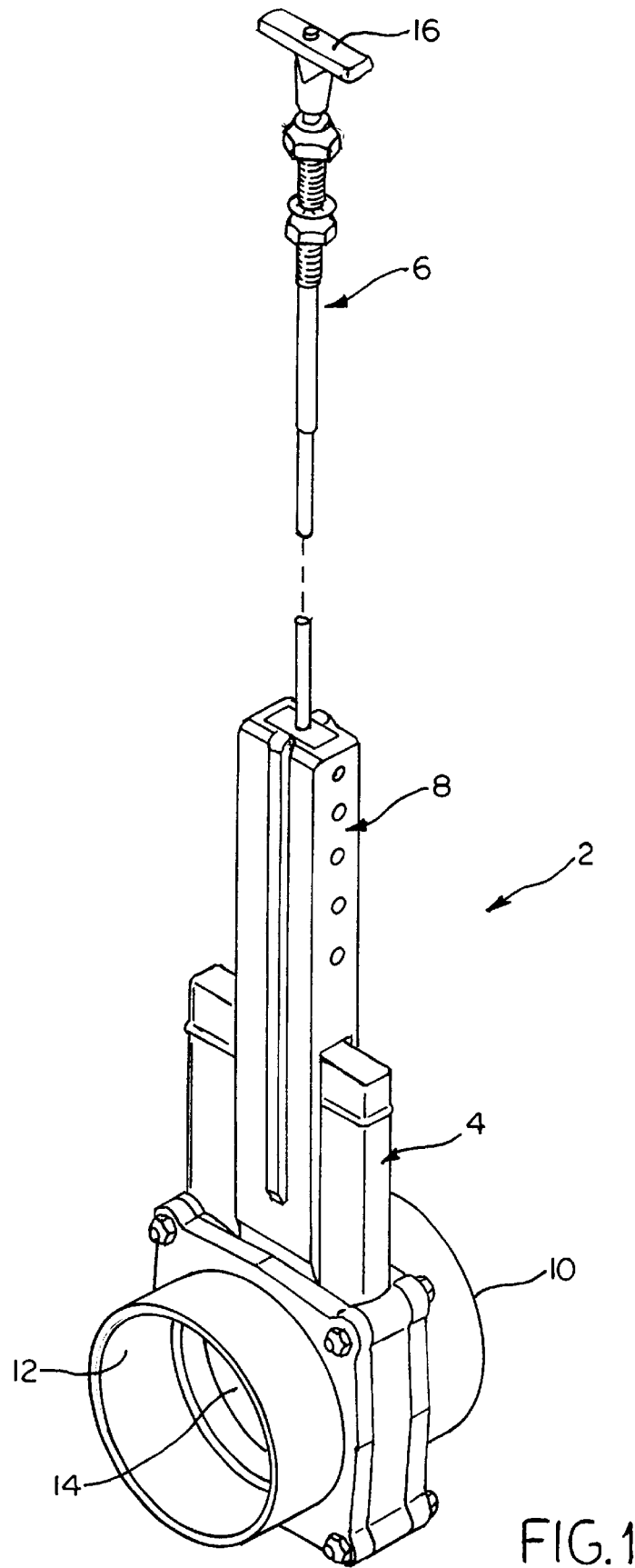
FIG. 1 is a perspective view of the preferred embodiment of the valve assembly.
Figure 11:
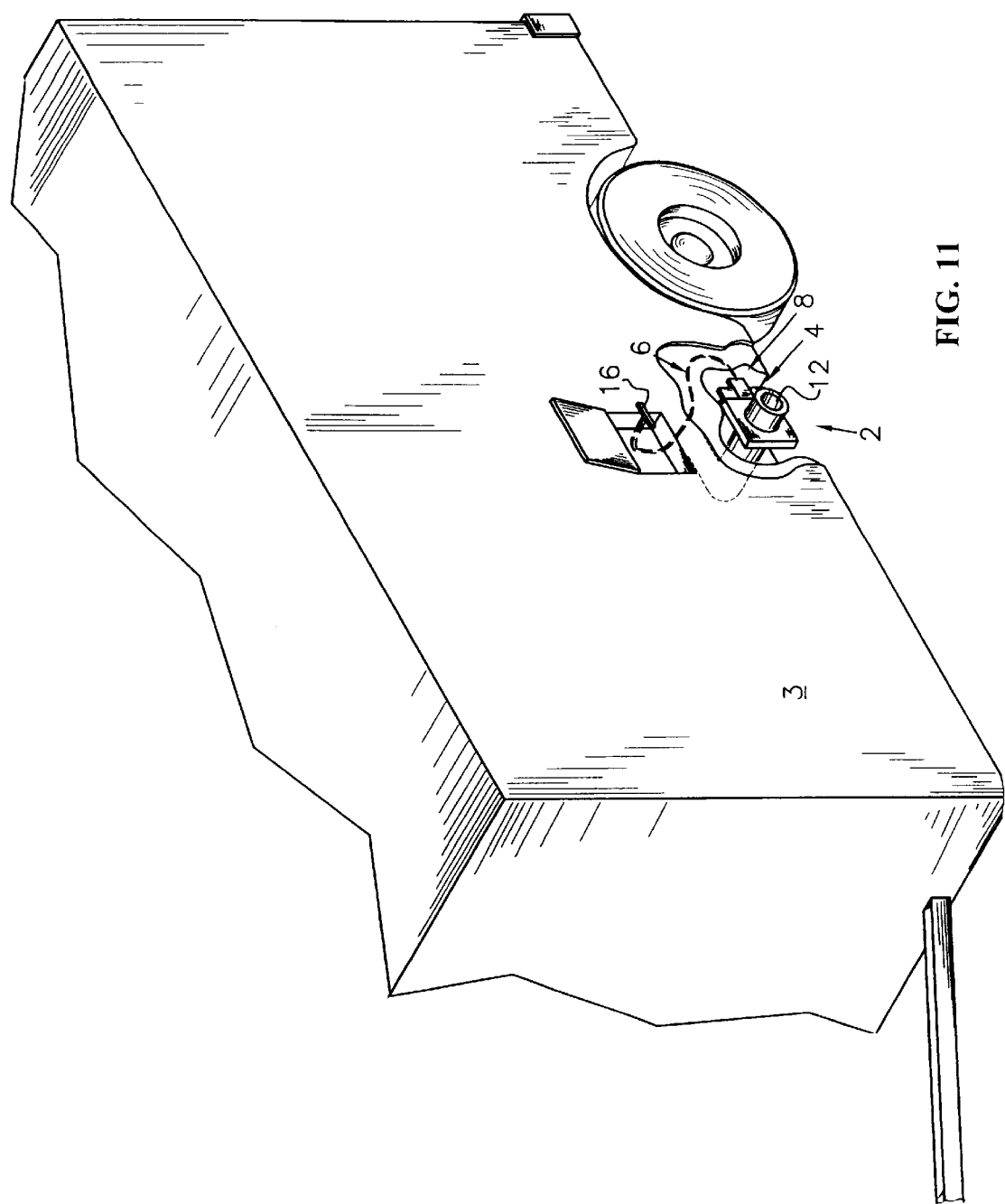
FIG. 11 is a prospective view of a recreational vehicle having the valve assembly installed therein.

With reference first to FIGS. 1 and 11, the valve assembly of the preferred embodiment of the invention is shown generally at 2 for use in a recreational vehicle 3, Valve assembly 2 comprises a valve member or body 4, a cable pull assembly 6 and a cable pull body shown at 8. It should be appreciated that valve member 4 will include an inlet port at 10 and an exit port at 12, where a gate member 14 is positioned medially between the inlet 10 and outlet 12 ports, to regulate the flow of fluid between the ports. In this particular case, the gate 14 will remain in the closed position, until the waste waters need be drained as discussed above. It should also be appreciated that the cable pull assembly 6 includes an actuation handle 16 operatively connected to the gate member 14, such that vertical movement of the handle 16 as viewed in FIG. 1, moves the gate member 14 vertically into the open position to discharge the waste waters.

Figure 2:
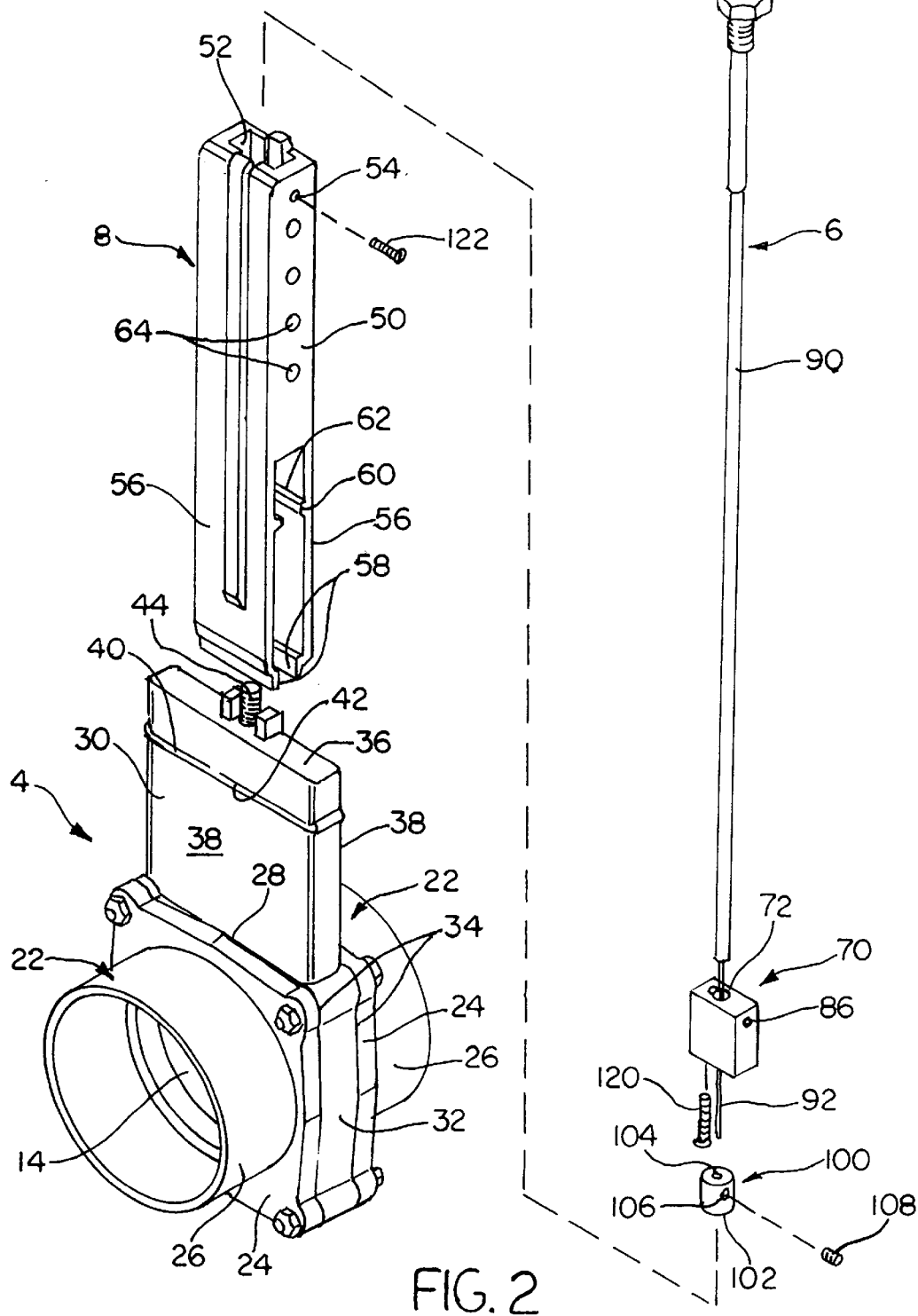
FIG. 2 is a view similar to that of FIG. 1 showing the major components in a disassembled manner, poised for assembly.
Figure 8:
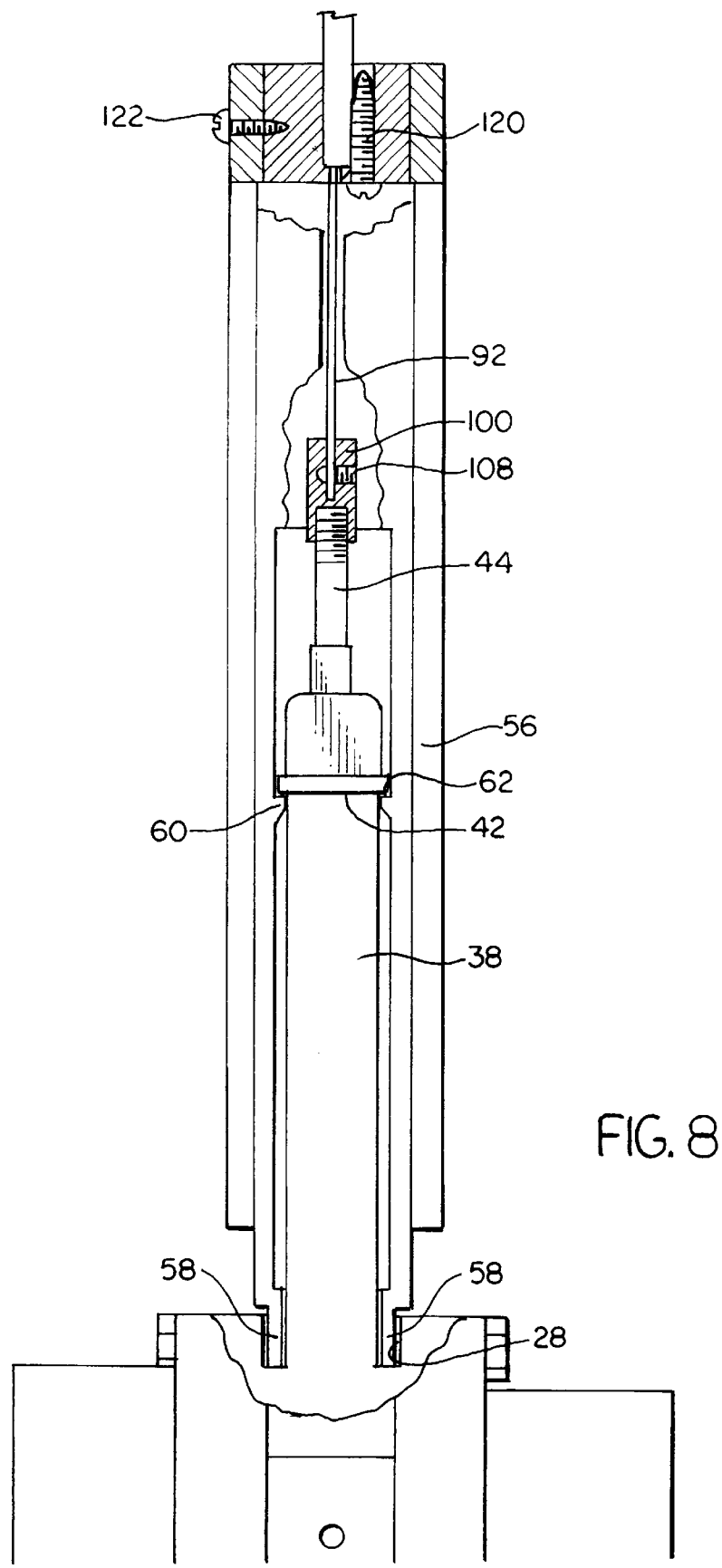
FIG. 8 is a side view of the valve assembly, partially broken away to show the attachment of the termination block to the cable pull assembly.

With reference now to FIGS. 2–6, the individual items of the assembly 2 will be described in greater detail. With reference first to FIG. 2, the valve member 4 includes identical, and opposing, flange members 22, where each includes a mounting flange section 24 with a protruding fitting section 26 which can be used to mount the valve member to inlet or discharge piping (not shown). The flange members 22 are flanking the gate valve housing 30 which includes a lower housing section 32 having mounting faces 34 for abutment against the flanges 22. The housing member 30 further comprises an upper body section 36 having substantially parallel faces 38 which include a latching rib at 40 which defines a downwardly facing latching face at 42. A valve stem is shown at 44 which is operatively connected through the upper body portion 36, and is connected to the gate member 14. It should be clear that vertical movement of the valve stem portion 44 has a direct correlation of the movement of the gate member 14.

With respect still to FIG. 2, the cable pull body 8 includes an upper body portion 50 having a termination block receiving cavity at 52, with an aperture at 54 extending through the body member 50 in a transverse direction to intersect with the cavity 52. The body member 50 further includes two latching leg members 56 which include reduced thickness tip sections 58 at the free ends thereof, and further comprises a latching rib 60 which defines an upwardly facing latching surface at 62. A plurality of apertures 64 extend into the sidewall of the cable pull body 8 as best shown in FIG. 2.

With reference still to FIG. 2, a termination block member is shown at 70 which is profiled for slidably receipt within the block receiving cavity 52 and includes an opening at 72 for receipt of the cable pull assembly. With respect now to FIGS. 3–6, the termination block 70 will be described in greater detail. As shown first in FIG. 3, the termination block 70 includes an upper face at 74, which defines the opening 72 therein. The opening 72 is comprised of a cable receiving opening at 76 together with a fastener receiving opening at 78. It should be appreciated that the openings 76 and 78, as viewed in FIG. 3, are of an intersecting circular configuration. As shown best in FIG. 4, opening 78 extends from the top face 74 through to a lower face at 80. Meanwhile the opening 76 stops shy of extending through to the lower face 80, but rather is counter sunk to form an upwardly facing stop surface at 82. An aperture at 84 communicates with the opening 76 to provide a continuous opening between the top 74 and bottom 80 surfaces. As shown in FIGS. 4 and 5, an aperture 86 extends through a side wall 88 but does not extend into the opening 76.

With reference again to FIG. 2, the cable pull assembly 6 is comprised of a flexible sheath or shroud member 90 which has an axial opening therethrough for receiving a solid cable member 92, the solid cable member 92 being longitudinally movable with the movement of the handle 16 as is well known in the art. Such a cable can be purchased from Cable Manufacturing & Assembly Co. In the preferred embodiment of the invention, the sheath 90 is comprised of an outer rubber member with an inner Teflon sheath, with a stainless steel wire mesh in between the inner and the outer sheath members. This allows the cable pull assembly 6 to be very pliable yet gives the cable member 92 a low frictional movement passageway for the operation. Finally, a locking collect at 100 is shown which includes a thread able opening from the lower side 102 and includes a cable receiving opening at 104, profiled to receive the cable 92. The collect 100 also includes a threaded aperture at 106 profiled for receiving a set screw 108.

Now referring to FIGS. 7 and 7a, cable pull assembly 6 includes an enlarged portion 110 at the upper end of sheath member 90. Enlarged portion 110 includes a threaded end 112 having external threads for securing cable pull assembly 6 to a frame member 114 or panel of the recreational vehicle. Frame 114 includes an aperture 115 for receiving threaded end 112. Two pairs of locking washers 116 and nuts 117 are placed about threaded end member 112 adjacent frame member 114, one pair on each side thereof, for purposes of securing cable pull assembly 6 to the frame. To secure actuation handle 16 to cable pull assembly 6, cable 92 is provided with a hexagonally shaped head 118 at the upper most portion thereof, and actuation handle 16 has a hexagonally shaped bore 119 for receiving hexagonal head 118. In assembling actuation handle 16 to cable pull assembly 6, hexagonal head 118 is inserted into hexagonal bore 119 until the hexagonal head abuts on seating surface 125 of actuation handle 16. The handle is secured with a screw 121, which engages internally threaded bore 123 of hexagonal head 118. The head of screw 121 seats in tapered counter bore 124 of actuation handle 16 so that the screw is substantially flush with the top of the handle.

With reference now to FIGS. 2–8, the assembly of the valve member 2 will be described in greater detail. It should be appreciated that the sheath assembly 90 of the cable pull assembly 6 is receivable in the aperture 76, with the solid cable portion 92 extending through the aperture 84, in the termination block 70. The cable sheath 90 is receivable into the aperture 76 until the end face of the cable sheath 90 abuts the surface 82. At this point a threaded fastener 120 is thread ably received into the aperture 78, which causes engagement between the fastener threads and the outer sheath member of the sheath assembly 90. In the preferred embodiment of the invention, the outside diameter of the threaded fastener 120 is somewhat smaller than the diameter of the aperture 78, so that the threaded aperture, absent the cable sheath in the aperture 72, could be received in a sliding fashion. However due to the intersecting circular configuration of apertures 76 and 78, when the cable sheath 90 is placed within the aperture 76, the cable sheath 90 overlaps within the profile of aperture 78 causing an interference fit between the threaded fastener 120 with the outer sheath of the sheath assembly 90 and with the peripheral wall of the aperture 78. In the preferred embodiment of the invention, the overlap of the intersecting circles of the aperture 76 and 78 is equal to the depth of the thread of the threaded fastener. It has been found that the thread will engage along the longitudinal length of the outer sheath member 90, and self thread along its longitudinal length, causing minimal deformation of the outer configuration of the sheath 90, while it still holds the sheath member in its axial manner.

The collect member 100 can now be thread ably received on to the top of the valve stem 44 as shown best in FIG. 7. The cable pull body 8 can now be received over the upper housing portion 36 of the valve body 4, so that the latching surfaces 62 on the inside of the leg members 56 are snap latch ably received beneath the latching shoulder 42, also best shown in FIG. 7. It should be appreciated that the reduced thickness tip 58, in this configuration, are received in the transverse grooves 28 in the top of the valve body housing, as shown in FIG. 7, which prevents outward deformation of the leg member 56. With the cable sheath member 90 fixed in the aperture 72, the termination block 70 can now be received in the cavity 52, with a threaded fastener 122 received through the aperture 54 of the cable pull body, which is self tapping into aperture 86 of the termination block 70. This threadable receipt of the threaded member 122 will now hold the termination block 70 in axial fixation with the cable pull body 8 while the cable pull assembly 6 is also held longitudinally fixed by way of the termination block 70. At this point the cable 92 has been received in the aperture 104 at the top of the collect 100, and the set screw can be accessed through an aperture 64 to tighten and fix the solid cable member 92 relative to the valve stem 44.

The design for mounting cable assembly 6 to frame member 14 as shown in FIGS. 7 and 7a enables the cable pull assembly to be preassembled to the valve body using the steps above prior to installing the valve body in the recreational vehicle. To install valve assembly 2 in the recreational vehicle, first protruding fitting section 26 is attached to the appropriate discharging pipe of the vehicle. Cable 92 and sheath member 90 are then conveyed within the recreational vehicle to the point where threaded end 112 will be attached to the frame or panel using lock washers 116 and nuts 117 and subsequently attaching actuating handle 16 to the hexagonal shaped head 118 using threaded fastener 121.

Figure 9:
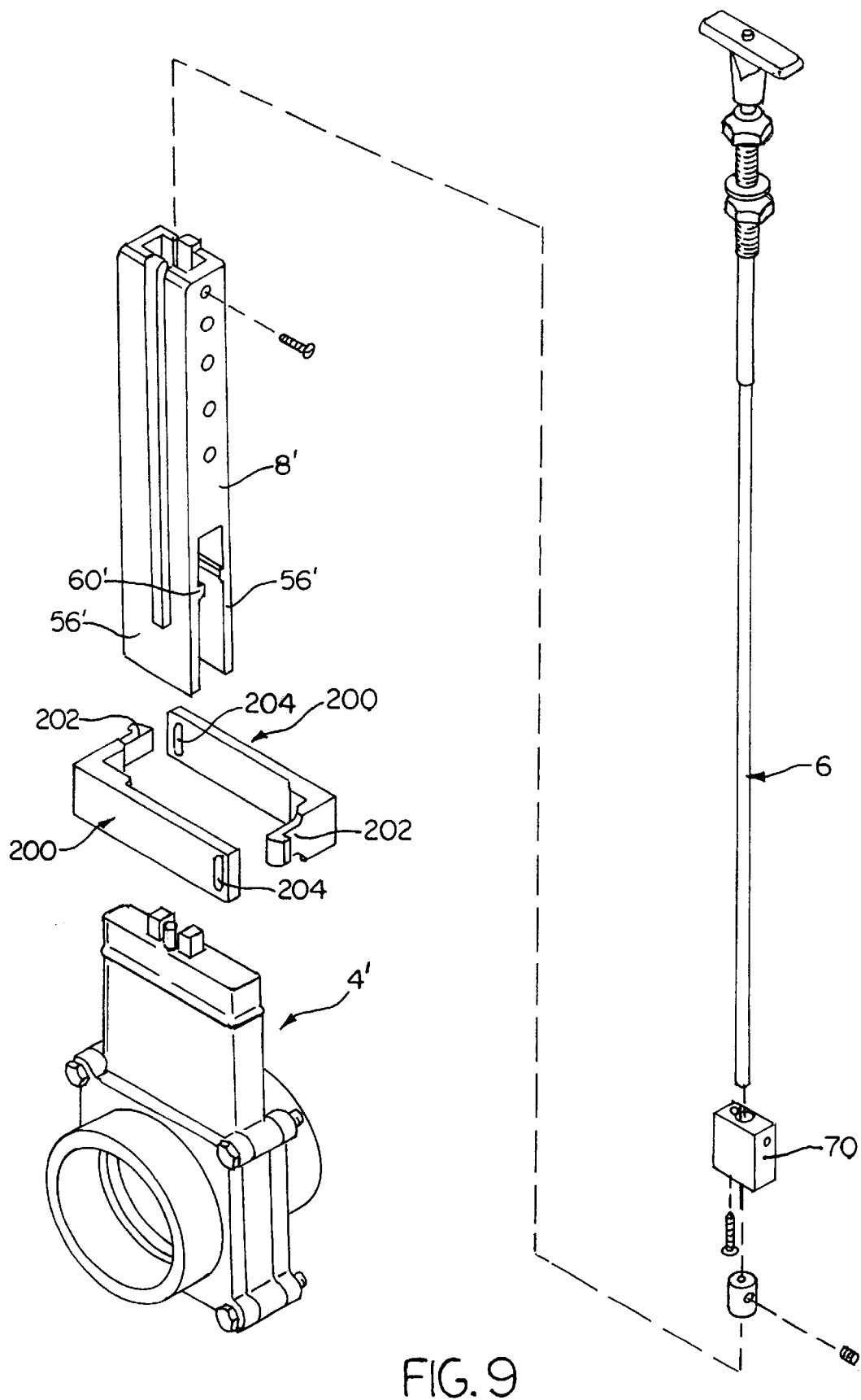
FIG. 9 is an exploded view of an alternate embodiment of the invention.
Figure 10:
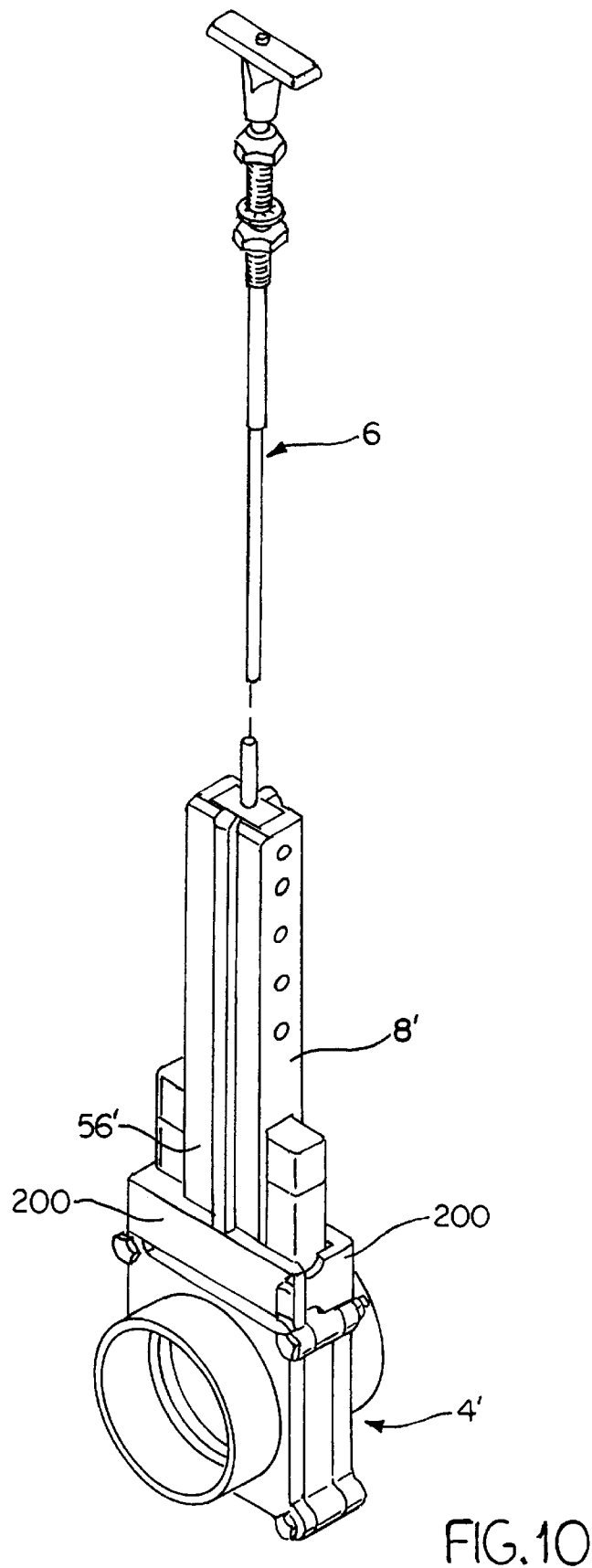
FIG. 10 is an assembled view of the embodiment shown in FIG. 9.

With respect now to FIGS. 9 and 10, an alternate embodiment of the invention is shown where the grooves 28 in the valve body housing are not made available due to the valve design. In this event, the cable pull body 8' is used which includes a similar latch structure including ribs 60' mounted on an internal surface of the legs 56'. In this particular design, the grooves 28 are not available for supporting and preventing outward deflection of the legs 56'. Therefore, two hermaphroditic latching straps 200 are included, each having latch arms 202 which engage with latching apertures 204, as shown in FIG. 9. With the latching straps 200 in a surrounding relationship to the legs 56', outward deflection of the legs 56' is once again prevented.

Various modifications of the above preferred embodiment can be made without departing from the spirit and scope of the invention. For example, although the termination block in the preferred embodiments uses two longitudinally extending openings, it is possible to secure the sheath member in the termination block using one large opening capable of accepting both the fastener and the sheath member or the opening for the fastener may intersect the opening for the sheath member at an angle thereto. In addition, the shape of the opening or openings may be varied from the circular configuration used in the preferred embodiment. Also, other methods of mechanically fixing the sheath member to preclude longitudinal movement thereof relative to the valve member may be made without departing from the scope and spirit of the invention. Furthermore, other types of latching configurations may be used to attach the cable pull body to the valve body. In addition, it should be realized that the exact frame member, panel member or other portion of the recreational vehicle that the actuating handle and the cable pull assembly is attached to is irrelevant to the scope of the invention.

While the invention has been taught with specific reference to these embodiments, someone skilled in the art will recognize that other changes can be made in form and detail without departing from the spirit and the scope of the invention. The described embodiments are to be considered in all respects as illustrative and not restrictive. The scope of the invention is, therefore, indicated by the following claims rather than by the description.

What is claimed is:

1. A gate valve assembly, comprising: a valve member having a fluid passageway therethrough, and a gate movable in a transverse direction to said passageway with a valve stem for moving said gate in said transverse direction; a cable pull body having a cable receiving aperture therethrough, said cable pull body having retaining legs on one end thereof, with a latching mechanism for snap latching to said valve body, and a cable retaining mechanism at the other end thereof; and a cable pull mechanism fixed to said cable pull body by said cable retaining mechanism, said cable pull mechanism comprising an elongated tubular shroud having a cable therein, said cable being connected to said gate, yet movable within said shroud to activate said gate between open and closed positions.

2. The valve assembly of claim 1, wherein the latching mechanism includes latching members on said retaining legs for snap latching to complementary latch members on the valve member.

3. The valve assembly of claim 2, wherein said valve member includes an undercut groove on both sides of said valve stem, and free ends of said retaining legs are receivable therein to prevent outward deflection of said retaining legs.

4. The valve assembly of claim 2, further comprising strap members which are receivable in a surrounding manner to said retaining legs, to prevent outward deflection thereof.

5. The valve assembly of claim 1, wherein said cable retaining mechanism includes a termination block for attaching to the tubular shroud for axial fixation of said tubular shroud, said termination block being receivable in an aperture of said cable pull body, said aperture being in communication with said cable receiving aperture.

6. The valve assembly of claim 5, wherein said termination block includes two intersecting apertures, where said first aperture receives said elongated tubular shroud and said cable therethrough, and said second aperture receives a fixing fastener therein which is held in the longitudinal direction to the termination block, and which holds the cable shroud in the longitudinal direction.

7. The assembly of claim 6, wherein the fixing fastener is a threaded member, and the termination block is profiled such that the threads of the threaded member engage the tubular shroud along the longitudinal length of the threaded member.

8. The assembly of claim 7, wherein the fixing fastener is a self tapping screw.

9. The assembly of claim 1, wherein the cable pull mechanism includes an actuation handle removably attached to said cable for actuating said gate, and wherein the cable may be inserted through a panel of a recreational vehicle from an interior side of the panel to an exterior side and said actuation handle is attached to the cable on the exterior side of the panel.

10. A gate valve assembly, comprising: a valve member having an opening therethrough for fluid passage, and a gate movable in a transverse direction to said opening with a valve stem for moving said gate in said transverse direction; a cable pull mechanism comprising an elongated tubular shroud having a cable therein being connected to said gate, and longitudinally movable within said shroud between open and closed positions; said shroud comprising three layers and being mechanically fixed to prevent longitudinal movement relative to said valve member.

11. The assembly of claim 10, further comprising a cable pull body attached to said valve member, a termination block being mechanically fixed to the cable shroud, said termination block mounted to said cable body.

12. The assembly of claim 11, wherein the termination block includes two longitudinally extending apertures, where said first aperture receives said shroud and said cable therethrough and said second aperture receives a fixing fastener for mechanically fixing the shroud to the termination block, and said cable pull body has at one end thereof, an opening for receiving said termination block, and a retaining assembly profiled for retaining said termination block to said cable pull body.

13. The assembly of claim 12, wherein said retaining assembly includes a through hole in said cable pull body transverse to said termination block receiving opening, and a second hole in said termination block, said through hole and said second hole being profiled for alignment when said termination block is properly positioned in said cable pull body, and a fastener member received in and extending beyond the through hole and into said second hole.

14. The assembly of claim 10, wherein said shroud of said cable pull mechanism includes an outer non-metallic shroud, and an inner non-metallic shroud, with an internal metallic sheath sandwiched therebetween, and a fixing fastener thread ably engageable into and engaging with, said outer non-metallic shroud.

15. The assembly of claim 10, wherein the cable pull mechanism includes an actuation handle releasably secured to said cable for activating said gate, and wherein the cable may be inserted through a panel of a recreational vehicle from an interior side of the panel to an exterior side and said actuation handle is attached to the cable on the exterior side of the panel.

16. A gate valve assembly comprising a valve member having an opening therethrough for fluid passage and a gate movable in a transverse direction to said opening with a valve stem for moving said gate in said transverse direction; a cable pull mechanism comprising an elongated tubular shroud having a cable therein being connected to said gate, and longitudinally movable within said shroud to move said gate between open and closed position, and an actuating handle removably attached to an end of said cable opposite said gate; and wherein the cable may be inserted through a panel of a recreational vehicle from an interior side of the panel to an exterior side and said actuation handle is attached to the cable on the exterior side of the panel.

17. A recreational vehicle having body panels and frame members and including a gate valve assembly for use in draining a storage tank contained in the recreational vehicle, said gate valve assembly comprising a valve body having a fluid passageway therethrough and a gate movable in a transverse direction to said passageway; and a cable pull mechanism comprising an elongated tubular shroud having a cable therein, said cable being connected to said gate, yet movable within said shroud to activate said gate between an open and closed position, and an actuating handle releasably attached to said cable at an end opposite said gate; and wherein the cable may be inserted through a panel of a recreational vehicle from an interior side of the panel to an exterior side and said actuation handle is attached to the cable on exterior side of the panel.

18. The recreational vehicle of claim 17, wherein said shroud of said cable pull mechanism includes an outer metallic shroud, an inner non-metallic shroud and an internal metallic sheath sandwiched therebetween.

19. The recreational vehicle as set forth in claim 17, including a cable retaining mechanism having a termination block and a fixing fastener to hold the shroud in said block.

20. The recreational vehicle as set forth in claim 19, wherein the termination block includes two longitudinally extending and intersecting apertures, wherein said first aperture receives said shroud and said cable and said second aperture receives said fixing fastener to hold the shroud member from moving in a longitudinal direction.

* * * * *

UNITED STATES PATENT AND TRADEMARK OFFICE
CERTIFICATE OF CORRECTION

PATENT NO.    : 6,364,286 B1  Page 1 of 1
DATED         : April 2, 2002
INVENTOR(S)   : Zsolt F. Vegso and Ray W. Cole It is certified that error appears in the above-identified patent and that said Letters Patent is hereby corrected as shown below:

<u>Column 8,</u>
Line 2, "thread ably" should be -- threadably --

Signed and Sealed this

Eighteenth Day of June, 2002

Attest:

JAMES E. ROGAN
Attesting Officer    Director of the United States Patent and Trademark Office